United States Patent [19]

Hirota et al.

[11] Patent Number: 4,836,838
[45] Date of Patent: Jun. 6, 1989

[54] APPARATUS FOR MOLDING GLASS ARTICLES

[75] Inventors: Shinichiro Hirota, Hachioji; Kishio Sugawara, Hamura; Tadayuki Fujimoto, Hachioji, all of Japan

[73] Assignee: Hoya Corporation, Tokyo, Japan

[21] Appl. No.: 249,875

[22] Filed: Sep. 26, 1988

[30] Foreign Application Priority Data

Sep. 30, 1987 [JP] Japan .................. 62-246217

[51] Int. Cl.⁴ .............................................. C03B 11/08
[52] U.S. Cl. ........................................ 65/308; 65/37;
65/106; 65/275; 65/286; 65/311; 65/317;
65/321
[58] Field of Search .................. 65/37, 106, 305, 308,
65/275, 286, 321, 323, 311, 317

[56] References Cited

U.S. PATENT DOCUMENTS

| | | | |
|---|---|---|---|
| 810,375 | 1/1906 | Myers | 65/308 |
| 810,570 | 1/1906 | Sagee | 65/308 |
| 2,357,993 | 9/1944 | Blau et al. | 65/317 |
| 3,244,497 | 4/1966 | Copeland | 65/308 X |
| 3,507,640 | 4/1970 | Lada | 65/308 |
| 4,734,118 | 3/1988 | Marechal et al. | 65/275 X |

FOREIGN PATENT DOCUMENTS 538762 6/1955 Belgium .............................. 65/308

*Primary Examiner*—Arthur Kellogg
*Attorney, Agent, or Firm*—Nixon & Vanderhye

[57] ABSTRACT

In an apparatus for molding glass articles, a plurality of processing chambers including a heating chamber, a press chamber and a cooling chamber are arranged in order along a predetermined circular transport path. The processing chambers are surrounded by a case within a furnace body. A rotary table is driven for intermittent rotation about an axis thereof. The transport path extends in concentric relation to the axis of the rotary table. The rotary table extends radially outwardly to a position below the case. A plurality of sample mounts are mounted on the rotary table and are arranged along the transport path in spaced relation to each other. The sample mounts extend into the processing chambers through a slit formed in a bottom wall of the case. A plurality of molds each having accommodated therein a glass preform to be molded are mounted respectively on the sample mounts. When the rotary table rotates intermittently, the molds are transported along the transport path so as to pass successively through the processing chambers.

4 Claims, 6 Drawing Sheets

APPARATUS FOR MOLDING GLASS ARTICLES

BACKGROUND OF THE INVENTION

The present invention relates to an apparatus for molding glass articles having high configuration precision or accuracy and fine surface roughness so that grinding or polishing after press-molding can be dispensed with.

In recent years, studies and researches have been conducted in which particular material is used to form a mold having an optical mirror surface, and press-molding is carried out within non-oxidizing atmosphere, thereby obtaining lenses having an optical mirror surface necessitating no grinding or polishing after the press-molding. In this connection, U.S. Pat. No. 3,833,347 discloses the use of glassy carbon as the material of the mold. It is disclosed in U.S. Pat. No. 4,139,677 to employ SiC or $Si_3N_4$ as the material of the mold. Further, it is disclosed in U.S. Pat. No. 4,168,961 to utilize mixture of SiC and carbon as the material of the mold. According to the molding method disclosed in these U.S. patents, the mold is first heated to a temperature level approximate to a glass softening point, that is, a Litolton point at which the temperature level corresponds to the viscosity of $10^{7.65}$ poises. A load is then applied to a glass preform within the mold, to carry out molding of the glass preform. Subsequently, the mold is cooled to a glass transition temperature or below, while the load is maintained applied to the pressed glass in order to prevent the pressed glass from being deformed. After the pressed glass has been solidified completely, the load is removed from the pressed glass. Subsequently, the mold is cooled to a low temperature level of 300 degrees C, and then the mold is opened. It is required for such molding method to carry out the above various processings at the same position, resulting in such a problem that the molding cycle time is lengthened considerably, and the molding speed is low.

Further, Japanese Patent Application Laid-Open No. 59-152229 discloses an apparatus in which various processing chambers including a heating chamber, a press chamber, a cooling chamber and the like are arranged linearly. A straight rail is arranged which extends through the processing chambers. A plurality of molds are arranged on the rail. A push rod pushes the molds to move the same along the rail, thereby successively molding the glass preforms within the respective molds. The apparatus is advantageous in that the molding speed is enhanced, because the molds are moved successively through the various processing chambers to process the glass preform continuously. However, the apparatus has the following problems in relation to the temperature distribution of the molds and the movement thereof.

That is, since each mold is mounted directly on the rail, heat is transferred from the rail brought to a considerably high temperature level, to a drag or a lower mold portion of the mold. Further, since the mold is arranged at a low location within the processing chamber, which is low in temperature, the drag and a cope or an upper mold portion of the mold are different in temperature from each other. Thus, the glass preform accommodated in the mold cannot be heated or cooled uniformly. This results in such problems that moldability of the glass preform is poor and, in particular, recesses are generated in the molded glass by shrinkage thereof.

Moreover, in the apparatus disclosed in the above Japanese patent, a single push rod is arranged within an insertion chamber through which the mold is introduced into the processing chamber from the outside of the apparatus. The mold is moved onto the guide rail by the single push rod. The mold mounted on the guide rail is pushed by the following mold, and advances through the processing chamber. It is required for such transport arrangement to transport the molds while overcoming the sliding friction between the rail and the molds mounted directly on the rail. That is, large urging force overcoming the maximum static friction force is required to be applied to the molds at each time of the start-up of the intermittent transportation. Thus, movement of the molds become awkward so that shocks occur at the start-up of the transportation. If the pressed glass just after the press-molding is subjected to such shocks, distortion occurs in the glass preform or pressed glass.

Furthermore, a glass article molding apparatus of rotary type is known from Japanese Patent Application Laid-Open No. 61-26528. In the apparatus, a plurality of processing chambers such as a heating chamber, a press chamber, a cooling chamber and the like are arranged circumferentially along a circle. A plurality of molds are mounted respectively on outer ends of respective support arms which extend radially from a central rotary shaft, such that the molds are passed successively through the processing chambers. The processing chambers are defined in such a manner as to be surrounded by upper and lower walls and radially inward and outward side walls or partition walls of a furnace body. The inward side wall is formed therein with a circumferential slit. The support arms extend into the processing chambers through the circumferential slit.

Since, for the above apparatus, the circumferentially extending slit is required to be formed in the inward side wall, a heater cannot be arranged at the region of the slit. By this reason, it is impossible to uniformly heat the mold and a glass preform accommodated therein. Further, because heat escapes from the processing chamber to the outside through the circumferential slit the temperature distribution within the processing chamber is not uniform.

In general, it is necessary to sufficiently uniformize the temperature distribution of each mold and the glass preform therein, in order to mold a glass article which does not require further preparing operation such as grinding or polishing after pressing. Otherwise, thermal shrinkage of the glass is unbalanced, making it impossible to obtain a glass article having high configuration accuracy, that is, high surface accuracy. Accordingly, the nonuniformity in the heating of the mold and the glass preform therein and the nonuniformity in the temperature distribution within the processing chamber, in the above-described conventional apparatus, are extremely disadvantageous in molding of the glass article of the aforesaid type.

Moreover, in the glass article molding apparatus of rotary type mentioned above, since the support arms extend radially into the processing chambers of high temperature atmosphere, the support arms are deformed by heat, so that the molds resting on the respective support arms are not brought to a predetermined pressing position. Accordingly, pressing force cannot accurately be applied to the mold at pressing. This results in deviation or shift and inclination of the central axes of the respective cope and drag of the mold, in turn, in deviation and tilt of the optical axis of the glass article.

Furthermore, since the arrangement is such that the support arms are rotated about the axis of the central shaft to move the molds, shocks are less or small which occur due to the static friction at the start-up of transportation between the processing chambers. Since, however, the support arms are low in strength, vertical vibration may occur, resulting in distortion in the glass article.

SUMMARY OF THE INVENTION

It is therefore an object of the invention to provide an apparatus capable of molding glass articles having high configuration precision and fine surface roughness, at high molding speed.

It is another object of the invention to provide a glass article molding apparatus capable of uniformizing temperature distribution in each mold and a glass preform or molded glass therein.

It is still another object of the invention to provide a glass article molding apparatus capable of reducing thermal deformation and vibration of transport means for transporting molds within processing chambers.

According to the invention, there is provided an apparatus for molding shaped glass articles, comprising:

a plurality of processing chambers arranged in order along a predetermined circular transport path, the processing chambers including a heating chamber, a press chamber and a cooling chamber, the processing chambers being formed in such a manner as to be surrounded by a case within a furnace body;

a rotary table rotatable intermittently about an axis thereof, the predetermined circular transport path extending in concentric relation to the axis of the rotary table, the rotary table extending radially outwardly to a position below the case forming the processing chambers;

a plurality of sample mounts mounted on the rotary table and arranged along the predetermined circular transport path in spaced relation to each other, the sample mounts extending into the processing chambers through a slit formed in a bottom wall of the case;

a plurality of molds mounted respectively on the sample mounts, each mold having accommodated therein a glass preform to be molded; and drive means for intermittently rotating the rotary table about the axis thereof to transport the molds along the predetermined circular transport path in such a manner that the molds pass successively through the processing chambers.

Preferably, the sample mounts have their vertical length which is so determined that the molds mounted respectively on the sample mounts are located substantially at vertical centers of the respective processing chambers. Further, it is desirable that each of the sample mounts is so formed as to enable a plurality of molds to pass through each of the processing chambers.

Preferably, a pair of press chambers are arranged on the predetermined circular transport path in spaced relation to each other.

DETAILED DESCRIPTION

Embodiments of the invention will be described below in detail with reference to the accompanying drawings.

In the embodiments of the invention, a glass preform to be molded is used, whose composition consists of 27.8 wt % $SiO_2$, 1.8 wt % $Na_2O$, 1.2 wt % $K_2O$, 65.2 wt % $PbO$, 2.0 wt % $Al_2O_3$, and 2.0 wt % $TiO_2$. The glass preform has its transition temperature which is 435 degrees C.

Figure 1:
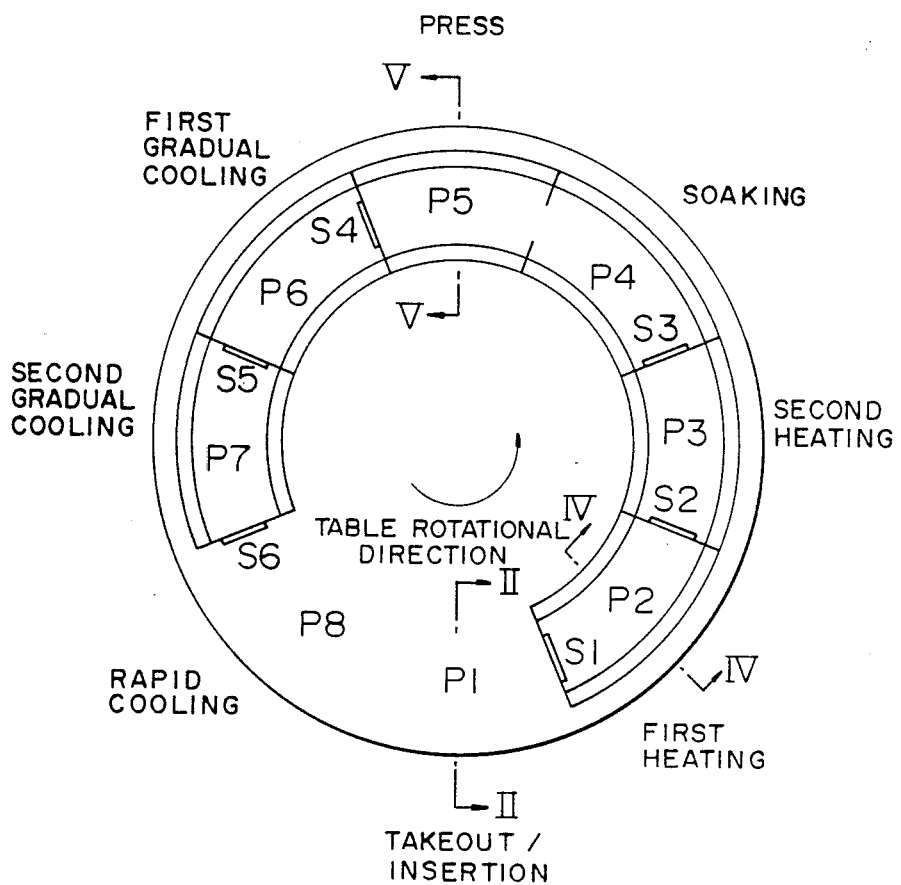
FIG. 1 is a schematic top plan view of a rotary-type glass article molding apparatus according to an embodiment of the invention.

Referring first to FIGS. 1 through 5, in particular to FIG. 1, there is shown a rotary type apparatus for molding glass articles, according to a first embodiment of the invention. The apparatus comprises a takeout/insertion chamber P1, and a plurality of processing chambers P (see FIG. 2), P2, P3, P4, P5, P6, P7 and P8 which are arranged in order circumferentially. A plurality of molds each having accommodated therein a glass preform to be molded or pressed glass are arranged on a rotary table in a single row along a predetermined circular transport path extending in concentric relation to an axis of the rotary table. The molds arranged along the transport path are spaced from each other equidistantly. When the rotary table rotates intermittently, the molds are passed one by one successively through the processing chambers P and P2 through P8 which are always under atmosphere of non-oxidizing gas. P2 is a first heating chamber, P3 is a second heating chamber, P4 is a soaking chamber, P5 is a press chamber, P6 is a first gradual cooling chamber, P7 is a second gradual cooling chamber, and P8 is a rapid cooling chamber. These processing chambers are partitioned by shutters S1, S2, S3, S4, S5 and S6, as shown in FIG. 1. In this connection, it is to be noted that no shutter is provided between the soaking chamber P4 and the press chamber P5. Each of the first heating chamber P2, the second heating chamber P3, the soaking chamber P4, the first gradual cooling chamber P6, the second gradual cooling chamber P7 and the rapid cooling chamber P8 will be referred also to as a temperature regulating chamber, because these chambers are provided for regulation of temperature.

The construction and operation of the takeout/insertion chamber, the various processing chambers and the mold will next be described in due order.

Figure 2:
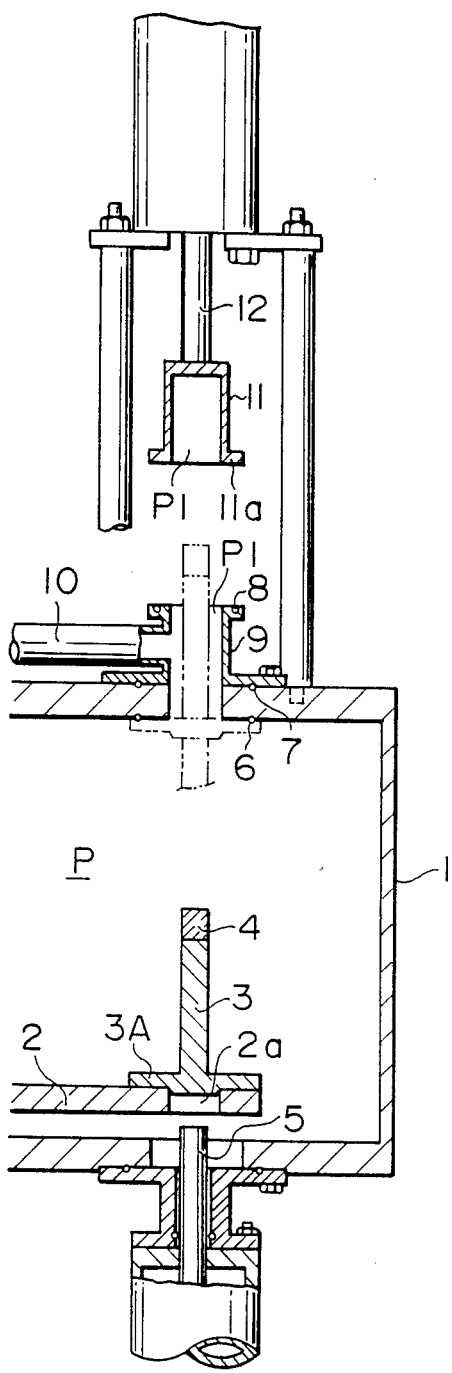
FIG. 2 is a fragmentary cross-sectional view taken along the line II—II in FIG. 1, showing a takeout/insertion chamber.

Referring to FIG. 2, there is shown the takeout/insertion chamber P1 cross-sectioned along the line II - II in FIG. 1. As shown in FIG. 2, the apparatus comprises a common furnace body 1 for forming the various processing chambers P, P2, P3, P4, P5, P6, P7 and P8. A rotary table 2 is arranged within the furnace body 1 and is driven for intermittent rotation about a central rotary shaft (not shown) by a index machine (not shown) operatively connected to the rotary shaft. The rotary table 2 is high in strength and, therefore, is difficult to be deformed. The rotary table 2 has an outer peripheral portion thereof which is formed therein with a plurality of through bores 2a spaced from each other circumferentially equidistantly. A plurality of sample mounts 3 are fitted respectively in the bores 2a. A plurality of molds 4 each having accommodated therein a glass preform to be molded or pressed glass are detachably set respectively on the tops of he sample mounts 3.

Each of the sample mounts 3 has so sufficient vertical length that the mold 4 set on the top of the sample mount 3 is located substantially at a vertical center of the processing chamber P defined within the furnace body 1 and below the takeout/insertion chamber P1. A lifting rod 5 is arranged at the processing chamber P and below the rotary table 2, for lifting the sample mount 3 up to a position indicated by the phantom lines in FIG. 2. The lifting rod 5 extends through the lower wall of the furnace body 1 and is formed by a piston rod of a piston-cylinder assembly. An O-ring 6 is mounted to an inner surface of the upper wall of the furnace body 1. A seal mount 9 is fixedly mounted to an outer surface of the upper wall of the furnace body 1 through an O-ring 7 which is arranged in coaxial relation to the O-ring 6. The seal mount 9 has an upper surface to which an O-ring 8 is mounted. A pipe 10 has one end thereof which is connected to the seal mount 9. The other end of the pipe 10 is connected to a vacuum pump and/or a tank filled with non-oxidizing gas (both not shown). A bell jar 11 is arranged above the seal mount 9 for vertical movement between an inoperative position where the bell jar 11 is spaced upwardly away from the seal mount 9 and an operative position where the bell jar 11 is abutted against the seal mount 9 and cooperates with the same to define the takeout/insertion chamber P1. A piston-cylinder assembly has a vertically extending piston rod 12 whose lower end is connected to the bell jar 11 for vertically moving the same between the inoperative and operative positions.

Except for the time the mold 3 is introduced into the processing chamber P through the takeout/insertion chamber P1 and the time the mold 4 is taken out of the processing chamber P through the takeout/insertion chamber P1, the bell jar 11 is moved downwardly by the piston rod 12 and is abutted against the seal mount 9 to close the takeout/insertion chamber P1. The closed takeout/insertion chamber P1 is filled with non-oxidizing gas such as, for example, nitrogen supplied through the pipe 10. When the rotary table 2 is rotated intermittently, the mold 4 mounted on the sample mount 3 moves together with the rotary table 2 around the axis thereof successively through the various processing chambers. As the mold 4 moves once around the axis of the rotary table 2, molding of the glass preform accommodated in the mold 4 is completed. When the mold 4 having accommodated therein the molded glass reaches the processing chamber P below the takeout/insertion chamber P1, the lifting rod 5 moves the sample mount 3 as well as the mold 4 upwardly from the processing chamber P toward the closed takeout/insertion chamber P1. In the meantime, as indicated by the phantom lines in FIG. 2, a flange 3A of the sample mount 3 is urged against the O-ring 6, to intercept communication between the processing chamber P and the takeout/insertion chamber P1. Subsequently, the bell jar 11 is moved upwardly away from the seal mount 9 by the piston rod 12. The mold 4 having accommodated therein the molded glass is removed from the sample mount 3 by a gripper or the like (not shown), and the molded glass is released from the mold 4. Subsequently, a succeeding mold 4, in which a glass preform to be molded has already been accommodated, is set on the sample mount 3. The bell jar 11 is then moved downwardly until the flange 11a of the bell jar 11 is abutted against the O-ring 8, to again close the takeout/insertion chamber P1. The takeout/insertion chamber P1 is once vacuum-evacuated and, subsequently, is filled with nitrogen. Then, the lifting rod 5 is moved downwardly, to lower the sample mount 3 on which the mold 4 rests, thereby fitting the mold 4 into the bore 2a in the rotary table 2. Subsequently, the shutter S1 shown in FIG. 1 is opened. It is to be noted that all the shutters S1 through S6 ar opened and closed simultaneously. The rotary table 2 is moved angularly about the axis thereof by 45 degrees, to move the sample mount 3 having mounted thereon the mold 4, from the processing chamber P to the first heating chamber P2. In the illustrated first embodiment, the above-mentioned operation from the point of time the mold 4 having accommodated therein the glass preform reaches the processing chamber P to the point of time the succeeding mold 4 reaches the processing chamber P2 is carried out for sixty (60) seconds, for example. In this case, the stationary time of the rotary table 2 is fifty-five (55) seconds, while the time required for angular movement of the rotary table 2 by 45 degrees is five (5) seconds.

Figure 3:
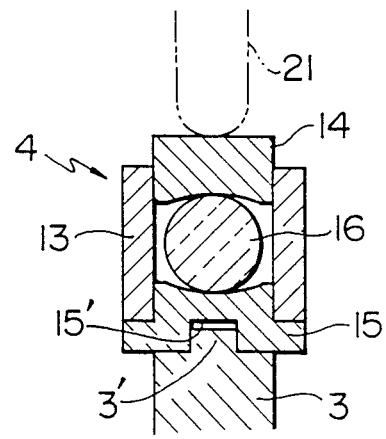
FIG. 3 is a fragmentary enlarged vertical cross-sectional view of a mold and a part of pressing means within the takeout/insertion chamber.

As described previously with reference to FIG. 2, the mold 4 having accommodated therein the molded glass is removed from the sample mount 3 by means of the gripper or the like. Subsequently, the succeeding mold 4 having accommodated therein the glass preform to be molded is mounted to the sample mount 3, and the sample mount 3 as well as the mold 4 is introduced into the processing chamber P. FIG. 3 shows the mold 4 introduced into the processing chamber P, the glass preform 16 to be molded within the mold 4, and a part of the sample mount 3. The mold 4 comprises a sleeve 13, and a pair of cope and drag or upper and lower mold portions 14 and 15. The cope 14 is fitted in the sleeve 13 for movement toward and away from the drag 15. The glass preform 16 to be molded is placed between the cope 14 and the drag 15. The drag 15 has its outer bottom face formed therein with a recess 15'. On the other hand, the sample mount 3 has its top formed with a projection 3'. The mold 4 is set on the sample mount 3 in such a manner that the projection 3' is fitted into the recess 15' in the drag 15. The projection 3' and size, so that the same sample mount 3 can be used for various molds 4 different in size and kind or type from each other.

Figure 4:
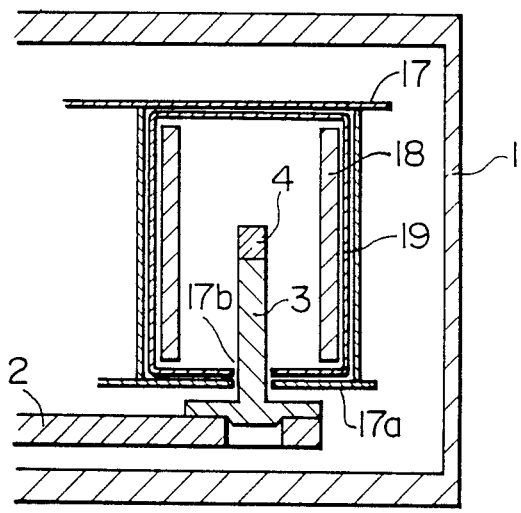
FIG. 4 is a cross-sectional view taken along the line IV—IV in FIG. 1, showing a first heating chamber.

FIG. 4 is a cross-sectional view of the first heating chamber P2. It is to be noted that the second heating chamber P3, the soaking chamber P4, the first gradual cooling chamber P6 and the second gradual cooling chamber P7 are different in temperature from the first heating chamber P2, but are the same in construction as the first heating chamber P2. The first heating chamber P2 is surrounded by a case 17 which is fixedly mounted to the furnace body 1 in a manner which is not shown. The case 17 has a bottom wall 17a formed therein with a slit 17b extending circumferentially. The sample mount 3 extends from below into the first heating chamber P2 through the slit 17b. A heater 18 and a reflector 19 are arranged within the case 17.

In the manner described above, the slit 17b through which the sample mount 3 extends is formed in the bottom wall 17a of the case 17. Accordingly, the heater 18 can be arranged along the entire radially inward side surface of the case 17, making it possible to uniformly heat the mold 4 and the glass preform 16 accommodated therein. Further, the slit 17b is formed in the bottom wall 17a of the case 17, which is located at a position lowest in temperature within the first heating chamber P2. Accordingly, an amount of heat escaping from the first heating chamber P2 within the case 17 to the outside can be reduced, making it possible to uniformize the temperature distribution within the first heating chamber P2. Furthermore, the sample mount 3 on which the mold 4 rests has the sufficient vertical length, in order to locate the mold 4 substantially at the vertical center of the first heating chamber P2 so that the mold 4 is subjected uniformly to heat radiation from the heater 18.

Moreover, the rotary table 2 is arranged on the outside of the case 17 and below the same, and is not inserted in and not arranged within the first heating chamber P2 of high temperature atmosphere surrounded by the case 17. Thus, the rotary table 2 can be prevented from being deformed by heat, making it possible to bring the mold 4 to a predetermined pressing position at pressing subsequently to be described.

It is preferable that a water cooling mechanism (not shown) is arranged within the rotary table 2 in order to prevent the lower section of the sample mount 3 from being heated excessively. Alternatively or additionally, a heat-insulating plate (not shown) may be arranged on the upper surface of the flange 3A to prevent the lower section of the sample mount 3 from being brought to a high temperature level. Although not shown, a thermocouple is arranged within the projection 3' (see FIG. 3) on the forward end of the sample mount 3. A lead line from the thermocouple extends through the central rotary shaft of the rotary table 2, and is connected to an instrument for measuring temperature of the forward end of the sample mount 3, that is, the bottom of the mold 4.

The first heating chamber P2 is kept at high temperature of 750 degrees C., so that the glass preform 16 within the mold 4 is heated rapidly. The mold 4 as well as the glass preform 16 is maintained stationary within the first heating chamber P2 for fifty-five (55) seconds. Subsequently, the shutter S2 is opened, and the rotary table 2 is moved angularly by 45 degrees. Thus, the mold 4 as well as the glass preform 16 is moved to the second heating chamber P3. By heating at the second heating chamber P3, the mold 4 as well as the glass preform 16 approaches a press temperature level. Subsequently, the mold 4 and the glass preform 16 are soaked at 500 degrees C. within the first soaking chamber P4, to bring the viscosity of the glass preform 16 to $10^{8.7}$ poises. The mold 4 is then transferred to the press chamber P5.

Figure 5:
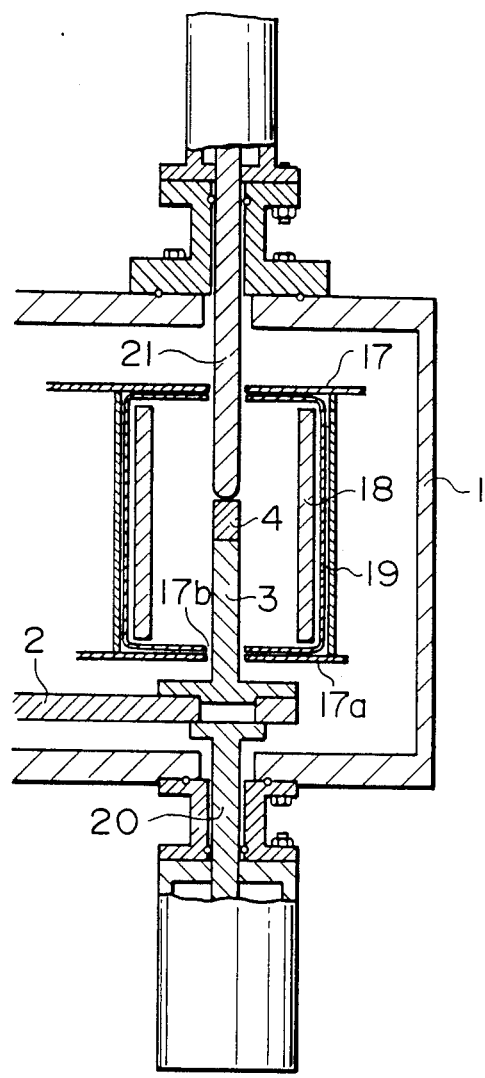
FIG. 5 is a cross-sectional view taken along the line V—V in FIG. 1, showing a press chamber.

The cross-sectional shape of the press chamber P5 is shown in FIG. 5. The press chamber P5 comprises a support rod 20 for supporting the rotary table 2 from below, and a pressing rod 21 for pressing the mold 4 as well as the glass preform 16 therewithin, in addition to the heater 18 and the reflector 19 which are arranged within the case 17. The support rod 20 and the pressing rod 21 are formed respectively by piston rods of piston cylinder assemblies.

When the mold 4 and the sample mount 3 coming from the soaking chamber P4 become stationary within the press chamber P5, the support rod 20 is moved upwardly to support the rotary table 2. On the other hand, the pressing rod 21 is moved downwardly to press the glass preform 16 maintained at the viscosity of $10^{8.7}$ poises (temperature: 500 degrees C.), at 60 kg/cm$^2$ for forty-five (45) seconds. Subsequently, the pressing rod 21 is moved upwardly to remove the pressure from the mold 4, and the support rod 20 is moved downwardly. The shutter S4 is then opened, and the mold 4 and the sample mount 3 are transferred to the first gradual cooling chamber P6 by intermittent rotation of the rotary table 2. When the rotary table 2 is intermittently rotated just after the pressing at the press chamber P5, there may be a case where distortion occurs in the configuration of the molded glass 16, if a shock is applied to the mold 4. In this connection, the apparatus according to the illustrated first embodiment employs the highly accurate or precise index machine, so that the mold 4 is transported smoothly, and substantially no shock is applied to the mold 4 during intermittent rotation of the rotary table 2.

Now, let it be supposed that an attempt is made to disassemble the mold 4 immediately after the pressing, to release the molded glass 16 from the mold 4. Then, it is impossible for weak force to release the molded glass 16 from the mold 4, because the molded glass 16 is in close contact with the mold 4. If the mold releasing is carried out with strong force, there is a likelihood that distortion occurs in the configuration of the molded glass 16, and the molded glass 16 is broken. In view of such inconvenience, in the invention, the mold 4 is transferred to the first and second gradual cooling chambers P6 and P7 where the molded glass 16 is cooled together with the mold 4, at least to a temperature level lower, by 10 degrees C. or more, than the glass transition temperature. Thus, contraction of the molded glass 16 per se forms a gap between the molded glass 16 and the mold 4. The molded glass 16 within the mold 4 is cooled within the first gradual cooling chamber P6 kept at 430 degrees C. Then, the molded glass 16 is further cooled within the second gradual cooling chamber P7 kept at 350 degrees C., to a temperature level of about 435 degrees C. which corresponds to the glass viscosity of $10^{13}$ poises. At this time, the cope 14 moves under its own weight, following contraction of the molded glass 16, so that the glass article can have its superior configuration accuracy.

Further, in the illustrated first embodiment, the molded glass 16 is rapidly cooled by gas blown from a rapid cooling mechanism (not shown) which is arranged within the rapid cooling chamber P8. The molded glass 16 as well as the mold 4 is then transferred to the processing chamber P. Subsequently, the mold 4 having accommodated therein the molded glass 16 is moved into the takeout/insertion chamber P1, in the manner described previously. The temperature of the takeout/insertion chamber P1 is brought to 250 degrees C. or less for preventing the mold 4 from being oxidized. The mold 4 as well as the molded glass 16 therein is taken out of the apparatus, and is disassembled to remove the glass article 16 from the disassembled mold 4.

In the illustrated apparatus, eight (8) sample mounts 3 are arranged on the rotary table 2 in a single circumferential row and in equidistantly spaced relation to each other, and nine (9) or ten (10) molds 4 are employed. The above-described operation is repeated continuously, whereby glass articles 16 are molded at such an extremely high molding speed as one per sixty (60) seconds. The thus obtained glass articles are then annealed. The glass articles after the annealing have their configuration accuracy equal to or less than two Newton rings and equal to or less than half of the astigmatism.

Figure 6:
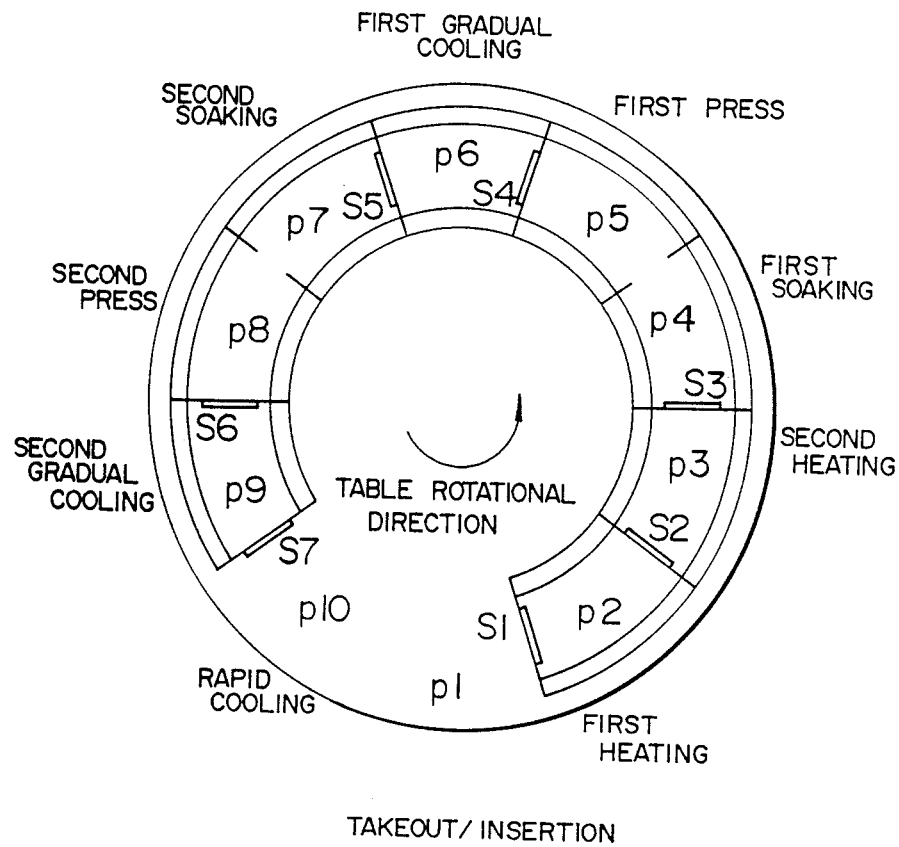
FIG. 6 is a schematic top plan view of a rotary-type glass article molding apparatus according to another embodiment of the invention.

FIG. 6 shows a glass article molding apparatus according to a second embodiment of the invention. The apparatus comprises a pair of press chambers p5 and p8 so that pressing is carried out at two positions. The pressing is carried out within the press chamber p5 under a glass viscosity and a pressure which are different from those under which the pressing is carried out within the press chamber p8. For instance, the pressing is carried out within the first press chamber p5 under the glass viscosity within a range of from $10^8$ to $10^{9.5}$ poises and at pressure of 60 kg/cm$^2$. On the other hand, the pressing is carried out within the second press chamber p8 under the glass viscosity within a range of from $10^{10.5}$ to $10^{12}$ poises and at pressure of 120 kg/cm$^2$. Processing chambers other than both the press chambers p5 and p8, that is, particularly a first gradual cooling chamber p6, a second soaking chamber p7 and a second gradual cooling chamber p9 can suitably be altered in number and layout in compliance with the glass preform to be molded.

Figure 7:
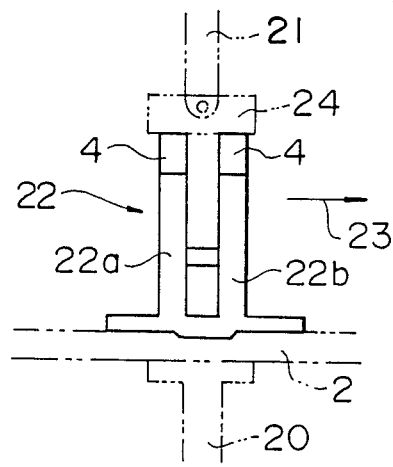
FIG. 7 is a side elevational view showing a modification of a sample mount and pressing means, for molding a plurality of glass articles simultaneously.

In the above-described first and second embodiments, a plurality of groups of molds may be employed in order to further accelerate the molding speed of the glass articles. That is, each group includes a plurality of molds each of which contains a glass preform or molded glass. The plurality of groups of molds are conveyed group by group successively through the processing chambers. The plurality of molds of each group are processed simultaneously at each processing chamber. In this case, the sample mounts on which the molds are mounted, and the pressing rods for pressing the molds are provided in plural correspondingly in number to the molds in each group. Alternatively, the forward end of each of the sample mounts is formed into a bifurcated shape. An example is shown in FIG. 7 in which a sample mount 22 is formed into a bifurcated shape. The sample mount 22 is mounted on the rotary table 2 in such a manner that a pair of bifurcated sections 22a and 22b are arranged in the rotational direction 23 of the rotary table 2. The pressing rod 21 has a pressure plate 34 which is wide correspondingly to the bifurcated sample mount 22. In this connection, a pair of separate pressing rod 21 may be substituted for the pressure plate 24.

As described above, the arrangement of the glass article molding apparatus according to the invention is such that the sample mounts extend into the processing chambers through the slit formed in the bottom wall of the case surrounding the processing chambers. With such arrangement, the heater can be arranged along the entire inward side surface of the case, and an amount of heat escaping from the processing chamber to the outside through the slit is reduced. Accordingly, the mold and the glass preform therein within the processing chamber can uniformly be heated, and the temperature distribution within the processing chamber can be uniformized. As a result, it is possible to prevent occurrence of recesses due to thermal shrinkage of the glass after the press-molding, so that there can be obtained the glass article having high configuration accuracy, that is, high surface accuracy.

Further, the arrangement is such that the rotary table is arranged on the outside of the case and below the same, and is not inserted in and not arranged within the processing chamber of high temperature atmosphere surrounded by the case. With such arrangement, the rotary table can be prevented from being deformed by heat. Thus, the mold can be brought to a predetermined pressing position at the pressing, making it possible to achieve accurate pressing. Moreover, since the rotary table is employed as means for transporting the molds, no vertical vibration occur, making it possible to prevent occurrence of distortion of the glass article due to the vibration.

What is claimed is:

1. An apparatus for molding shaped glass articles, comprising:
   a plurality of processing chambers arranged in order along a predetermined circular transport path, said processing chambers including a heating chamber, a press chamber and a cooling chamber, said processing chambers being formed in such a manner as to be surrounded by a case within a furnace body;
   a rotary table rotatable intermittently about an axis thereof, said predetermined circular transport path extending in concentric relation to the axis of said rotary table, said rotary table extending radially outwardly to a position below said case forming said processing chambers;
   a plurality of sample mounts mounted on said rotary table and arranged along said predetermined circular transport path in spaced relation to each other, said sample mounts extending into said processing chambers through a slit formed in a bottom wall of said case;
   a plurality of molds mounted respectively on said sample mounts, each mold having accommodated therein a glass preform to be molded; and
   drive means for intermittently rotating said rotary table about the axis thereof to transport said molds along said predetermined circular transport path in such a manner that said molds pass successively through said processing chambers.

2. An apparatus according to claim 1, wherein said sample mounts have their vertical length which is so determined that said molds mounted respectively on said sample mounts are located substantially at vertical centers of the respective processing chambers.

3. An apparatus according to claim 1, wherein each of said sample mounts is so formed as to enable a plurality of molds to pass through each of said processing chambers.

4. An apparatus according to claim 1, including a pair of press chambers arranged on said predetermined circular transport path in spaced relation to each other.

* * * * *